Oct. 23, 1951   W. A. RAY   2,572,386
THERMAL VALVE-OPERATOR
Filed July 24, 1946
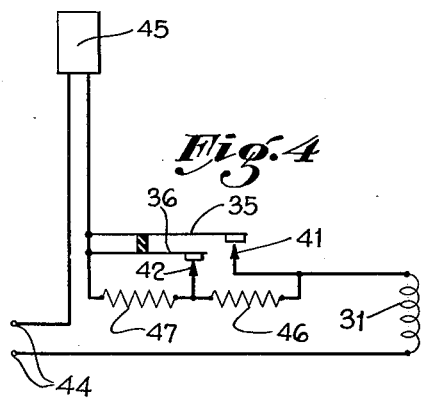
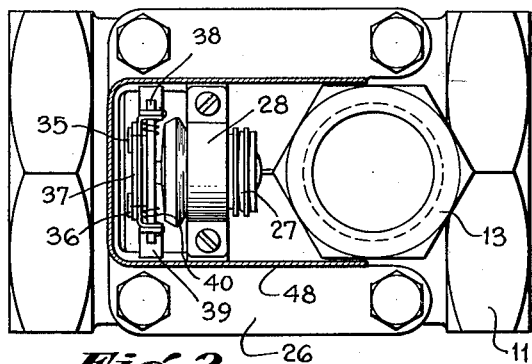
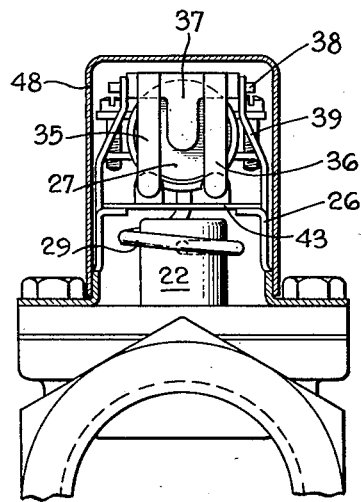
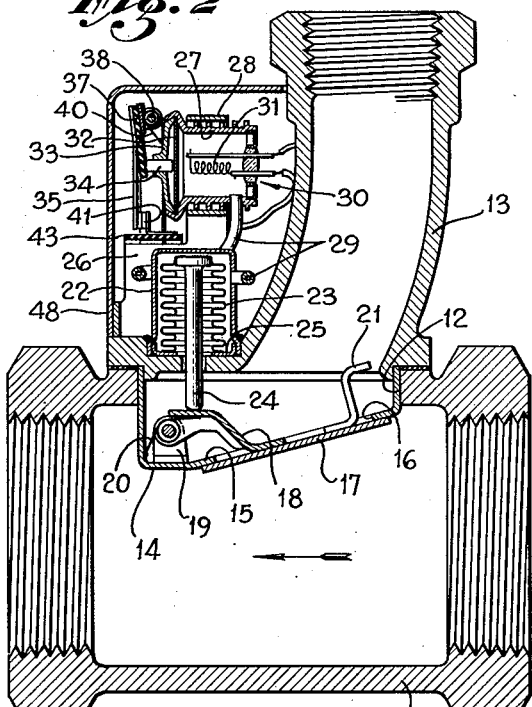
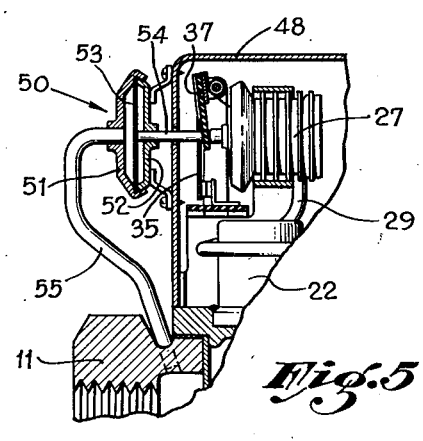
Inventor:
WILLIAM A. RAY,
By John H. Rouse,
Attorney.

Patented Oct. 23, 1951

2,572,386

UNITED STATES PATENT OFFICE 2,572,386

THERMAL VALVE OPERATOR

William A. Ray, North Hollywood, Calif., assignor to General Controls Co., Glendale, Calif., a corporation of California Application July 24, 1946, Serial No. 685,941

5 Claims. (Cl. 137—139)

My present invention relates to thermal operators, and more particularly to one especially adapted for operating fluid-control valves.

An object of this invention is to provide a thermal operator which affords a "packless" connection with the valve.

Another object is to provide, in a thermal operator of the fluid-expansion type, means responsive to the pressure of said fluid for so controlling the thermal energy as to prevent abnormal rise of the pressure.

Another object is to provide, in a thermal operator of the character described in the preceding object, means for modifying the operation of the energy-controlling means in accordance with the pressure of the fluid controlled by the valve.

For full understanding of the invention, and further appreciation of its objects and advantages, reference is to be had to the following detailed description and accompanying drawing, and to the appended claims.

In the drawing:

Figure 1 is a sectional view of a fluid-control valve, and a thermal operator therefor embodying the invention;

Figures 2 and 3 are views in plan and in end elevation, respectively, of the structure of Fig. 1, with the cover 48 broken away;

Figure 4 is an electrical diagram of the heat-controlling circuit; and

Figure 5 is a fragmentary sectional view showing modified means for controlling the thermal operator.

The valve casing shown in Fig. 1 comprises a horizontal inlet section 11 having an opening 12 through its top wall, around which opening is secured a tubular outlet section 13. Forming a partition between these sections is a cup-shaped member 14 tightly fitting the opening 12 and having an inclined bottom wall 15. Cooperable with an opening 16 through this wall is a plate-like closure 17 which is carried by an arm 18 pivoted on a bracket 19 secured to the member 14; a spring 20 biasing the closure toward closed position, and a stop 21 limiting the extent of its opening movement.

The valve shown herein by way of example is of a type particularly adapted for use in a conventional heating system wherein hot water is circulated (in the direction of the arrow in Fig. 1) through a pipe in which the casing-section 11 is connected; upon opening of the closure 17 a portion of the water being diverted, due to its velocity head, by way of the section 13 through a radiator, the outlet of which is connected to the hot-water pipe at the down-stream side of the valve.

Secured, as by brazing, in a recess formed in a horizontal side-portion of the casing-section 13 is an inverted cup-shaped housing 22 encompassing an expansible-contractible bellows 23 from the head of which a stem 24 extends freely through an opening in the casing into engagement with the closure-arm 18; the mouth of the bellows being sealingly joined to the housing, by means of a washer 25, so that it forms a packless connection between the valve and the motor constituted by the bellows and housing.

Mounted above the motor on a bracket 26 is a pressure-generating device comprising a hollow member 27, the finned outer surface of which is clamped by a strap 28 to the bracket. The interior of the member 27 is in communication with the motor by way of a pipe 29 which is wrapped once around the housing 22 to afford a resilient connection. The right-hand end of member 27 is closed by a glass-seal arrangement 30 which serves to support the terminals of an electric heater or resistance coil 31. Closing the expanded opposite end of the member 27 is a metallic diaphragm 32 which is clamped in place by a disk 33 (around the edge of which the end portion of the member is turned over) which is centrally apertured to freely receive a pin 34 bearing against the diaphragm.

The pressure chamber formed by the interior of member 27, the space between housing 22 and bellows 23, and the pipe 29, is charged with the usual thermally-expansible or vaporizable fluid which, when heated by energization of coil 31, expands and thereby forces the bellows head downwardly to effect opening of the closure 17. The diaphragm 32 is relatively stiff so that it does not yield appreciably under the pressure required to open the valve. However, when the closure is in its wide-open position, in which further movement thereof is arrested by the engagement of stop 21 with the member 14, continued heating of the fluid effects flexure of the diaphragm and outward movement of pin 34. Arranged for actuation by this pin are switching means comprising a pair of contact arms or blades 35 and 36 carried by a support 37, of insulating material, which is mounted on a pin 38 pivotally supported in openings through side extensions 39 (Fig. 3) of the bracket 26 and biased in a counterclockwise direction by a spring 40 into engagement with the pin 34. The contact blades 35—36 cooperate respectively with fixed contacts 41 and 42 mounted on an insulated platform 43 supported by bracket 26.

The circuit controlled by the switching means is shown in Fig. 4 wherein the numeral 44 indicates terminals which it will be assumed are connected to the electric service lines, and a thermostat 45 which serves to control automatically the energization of heater 31 (and thereby the operation of the valve) in accordance with the temperature of a space with which the valve is associated; both of the blades 35—36 normally being in engagement with their respective contacts so that the current passes directly therethrough to the heater. The switching means are normally in shunt with a pair of resistors 46—47, and the blades 35—36 are so flexed that in the outward movement of pin 34 the blade 35 is disengaged from its contact 41 before the blade 36 is disengaged (this condition being indicated in Fig. 4) so that the current must then pass through resistor 46 to the heater 31 and the energization of the same is accordingly reduced. If the reduction of heating is insufficient to prevent continued rise of pressure of the fluid, farther outward flexure of the diaphragm effects disengagement of the blade 36 so that the current in the heater circuit must pass through both of the resistors 46—47 in series and further rise of pressure in the thermal system is prevented. If the pressure should then drop, the resistor 47 is again shunted-out to effect compensating rise of temperature of the heater. By the sequential arrangement of the switching means, the pressure in the thermal system is maintained substantially constant while the valve is in open condition in response to the demand of the thermostat.

In Fig. 5 means are shown for modifying the actuation of the switching means in accordance with the pressure of the fluid controlled by the valve. This pressure acts upwardly on the head of the bellows 23 when the valve is open, and if it is relatively high tends to so affect the switching means, through the diaphragm, that the heater 31 does not reach its proper operating temperature. To nullify the effect of the valve-fluid pressure, there is mounted on the cover 48 a fluid-pressure motor 50 which comprises a pair of dished members 51 and 52 joined together with a metallic diaphragm 53 therebetween. Extending from this diaphragm, through openings in member 52 and cover 48, is a pin 54 which bears against the blade-support 37. The pressure chamber defined by the member 51 and diaphragm 53 is in communication with the interior of the valve casing by way of a pipe 55, and it is thus clear that the effects of valve-fluid pressure upon the switching means are in opposition and tend to cancel-out.

The embodiments of my invention herein shown and described are obviously susceptible of modification without departing from the spirit of the invention, and I intend therefore to be limited only by the scope of the appended claims.

I claim as my invention:

1. In a thermal valve-operator: a valve casing; valve means within said casing for controlling fluid flow therethrough; an expansible-contractible bellows sealingly mounted by its mouth on the exterior of the casing and covering an opening therethrough; means extending from the head of said bellows through said opening for operating said valve means; means at the exterior of the casing defining, with the exterior of said bellows, a pressure chamber containing thermally-expansible fluid; electrical means for heating said fluid to effect movement of said valve-operating means inwardly of the casing; means limiting said inward movement of the valve-operating means; a flexible diaphragm sealingly covering an opening through said chamber-defining means; a circuit for energizing said heating means; electrical resistance means for reducing flow of current in said circuit; and switching means for controlling said circuit mounted on the exterior of the chamber-defining means and actuated by flexure of said diaphragm, under the pressure of the fluid in the chamber, when the valve-operating means is in its limited position; said switching means acting, in response to rise of pressure in the chamber due to the positioning of said valve in its limiting position, to render said resistance means effective in said circuit and thereby reduce the amount of energy produced by the heating means.

2. A thermal valve-operator, as defined in claim 1, and including means responsive to the pressure of the fluid in said valve casing for applying force to said diaphragm opposing the thermal-fluid pressure applied thereto.

3. In a thermal valve-operator: a valve casing; valve means within said casing for controlling fluid flow therethrough; an expansible-contractible bellows sealingly mounted by its mouth on the exterior of the casing and covering an opening therethrough; means extending from the head of said bellows through said opening for operating said valve means; a housing encompassing the exterior of the bellows and constituting the same a pressure motor; means for generating pressure to operate said motor, and thereby effect movement of said valve-operating means inwardly of the casing, comprising a hollow member, containing thermally-expansible fluid, fluidly connected to the motor, and an electric heater within the member; means limiting said movement of the valve-operating means inwardly of the casing due to rise of pressure in said motor; and means for preventing excessive pressure in the motor when the valve-operating means is in its limited position, comprising a flexible diaphragm forming a wall of said hollow member, and switching means mounted on the exterior of the member and cooperable with said diaphragm to control the energization of said heater, the arrangement being such that outward flexure of the diaphragm, due to continued rise of pressure in the motor when said valve-operating means is in its limited position, effects reduction of the amount of energy supplied to the heater.

4. In a thermal valve-operator: a valve casing; means within said casing for controlling fluid flow therethrough; means for operating said flow-controlling means, comprising a main movable wall sealingly covering an opening through a wall of the casing and having means operatively engageable with the flow-controlling means; means at the exterior of the casing defining, with said main movable wall, a pressure chamber containing thermally-expansible fluid; electrical means for heating said fluid to effect movement of said main wall inwardly of the valve casing; means limiting said inward movement of the main wall; said chamber-defining means including, at the exterior of the valve casing, an additional wall movable in response to continued rise of pressure in the chamber when said inward movement of the main wall is limited; a circuit for energizing said heating means; electrical resistance means for reducing flow of current in said circuit; and switching means, actuated by movement of said additional wall when the same is moved in response to said continued rise of pressure in the chamber, for rendering said resistance means effective in said circuit and thereby reducing the amount of energy produced by the heating means when said main wall is in its limited position.

5. A thermal valve-operator, as defined in claim 4, and including means responsive to the pressure of the fluid in said valve casing for applying force to said additional wall opposing the thermal-fluid pressure applied thereto.

WILLIAM A. RAY.

REFERENCES CITED

The following references are of record in the file of this patent:

UNITED STATES PATENTS

| Number | Name | Date |
| --- | --- | --- |
| 1,115,545 | Hynes | Nov. 3, 1914 |
| 1,643,523 | Sauvage | Sept. 27, 1927 |
| 1,881,964 | Persons | Oct. 11, 1932 |
| 2,042,523 | Graham | June 2, 1936 |
| 2,197,454 | Smith | Apr. 16, 1940 |

FOREIGN PATENTS

| Number | Country | Date |
| --- | --- | --- |
| 397,239 | Great Britain | Aug. 24, 1933 |